Sept. 6, 1932.  W. J. BELL  1,875,554
MIRROR BRACKET STRUCTURE
Original Filed Jan. 2, 1929  2 Sheets-Sheet 1
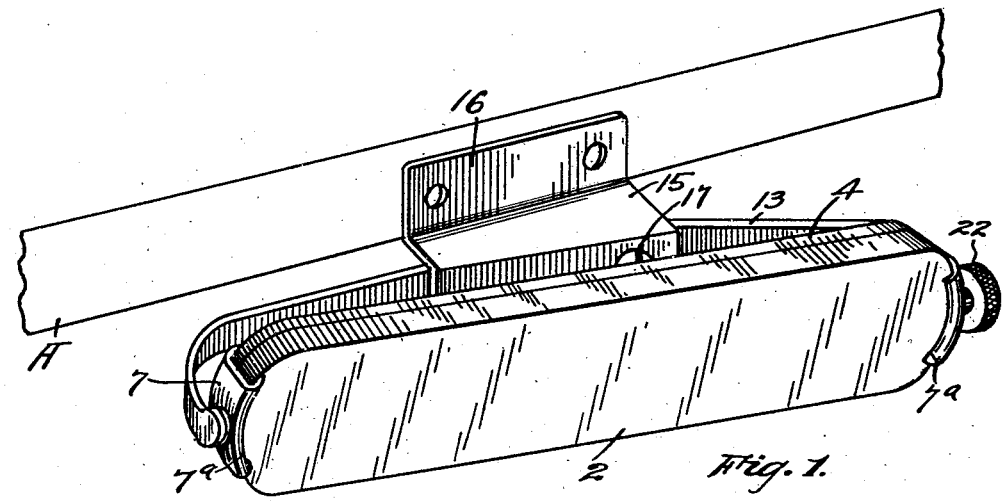
Fig. 1.
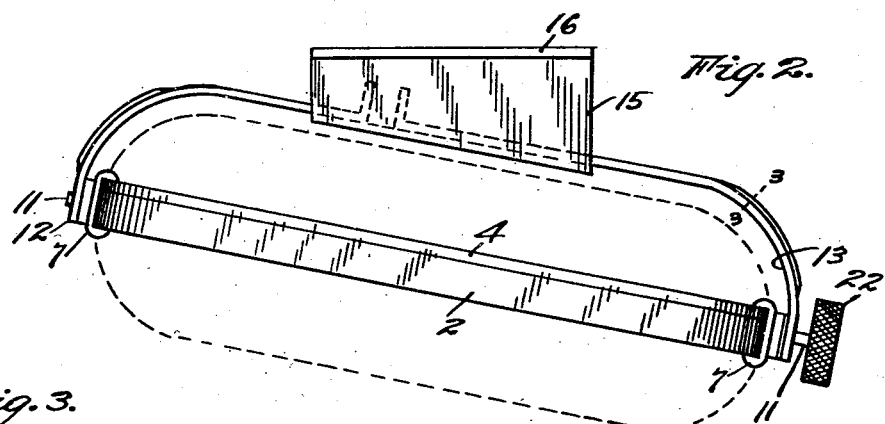
Fig. 2.
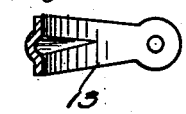
Fig. 3.
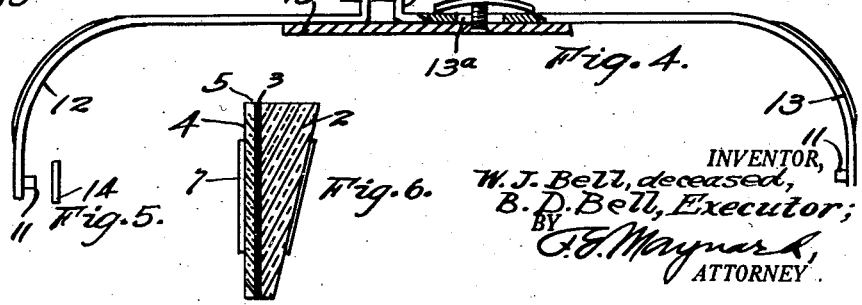
Fig. 4.
Fig. 5. Fig. 6.
INVENTOR,
W. J. Bell, deceased,
B. D. Bell, Executor;
BY
ATTORNEY.

Sept. 6, 1932.  W. J. BELL  1,875,554
MIRROR BRACKET STRUCTURE
Original Filed Jan. 2, 1929   2 Sheets-Sheet 2
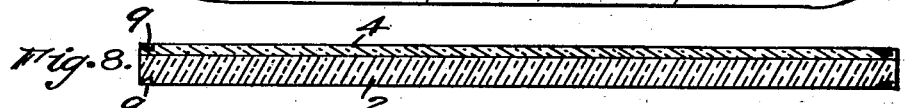
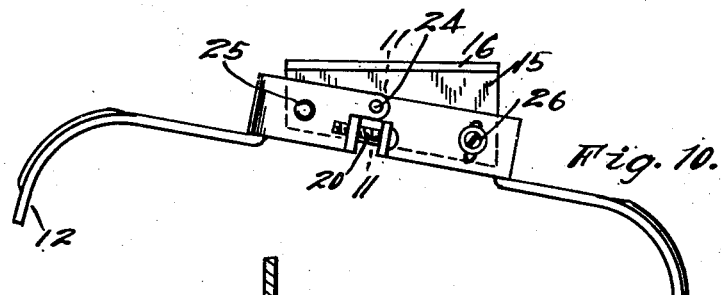
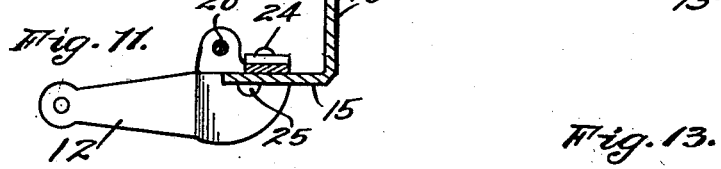
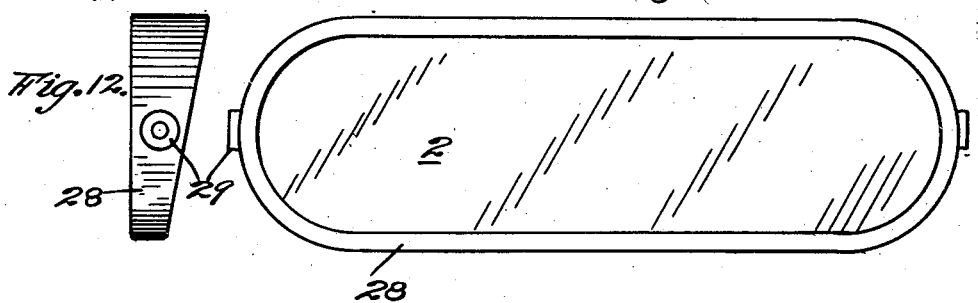
INVENTOR
W. J. Bell, deceased,
B. D. Bell, Executor;
BY
A. J. Maynard
ATTORNEY Patented Sept. 6, 1932

1,875,554

UNITED STATES PATENT OFFICE

WALTER JOEL BELL, DECEASED, LATE OF LOS ANGELES, CALIFORNIA, BY BYRON D. BELL, EXECUTOR, OF LOS ANGELES, CALIFORNIA

MIRROR BRACKET STRUCTURE

Original application filed January 2, 1929, Serial No. 329,792. Divided and this application filed October 18, 1929. Serial No. 400,604.

This invention relates to vehicular accessories and more especially to a rear view device for day and night use.

The present invention is an improvement of the mirror set forth in the Patent No. 1,699,043 dated Jan. 15, 1929 and is a division of the application No. 329,792 filed Jan. 2, 1929. In that patent the mirror included a translucent or colored screen set at an angle to a reflecting means, the purpose being to enable use of the colored screen to modify brilliant rays from lights of trailing vehicles.

In that patented mirror a clear mirror glass and a clear color glass were combined to form the modifying means. It is an object of the present invention to simplify the structure and yet achieve the same results of modified trailing-light reflection.

A further purpose served by the present invention is to provide a low cost, simplified and substantial structure, and also provide a very handsome article.

Additional objects, advantages and features of construction and combination of means, and details will be made manifest in the ensuing description of the herewith illustrative apparatus; it being understood that modifications, variations and adaptations may be resorted to within the spirit, scope and principle of the invention as it is more directly claimed hereinafter.

Figure 1 is a perspective of the preferred form of the device, as installed for use.

Figure 2 is a plan thereof.

Figure 3 is a sectional elevation of a clamp arm, section on line 3—3, Figure 2.

Figure 4 is a horizontal view, partly in section, of the adjustable clamp arms of Fig. 2, but showing a modified arrangement of the mirror supporting trunnions.

Figure 5 is an edge view of a friction washer.

Figure 6 is a transverse section of a dual function mirror unit.

Figure 7 is a face view of a mirror glass.

Figure 8 is a central horizontal section of the mirror unit of Figure 7, showing recessed clincher faces.

Figure 9 is a similar section showing a modification having bead clincher ends.

Figure 10 is a plan of a pivoted, unit clamp, for angular adjustment.

Figure 11 is a section on line 11—11 of Figure 10.

Figure 12 is an end view of a framed unit, and

Figure 13 is a face view of the unit.

The present invention is an advance over the above mentioned patent in that for the purpose of obtaining a subdued reflection from a trailing, brilliant light instead of employing a colored transparent glass set at an angle to a spaced and separate reflector the instant device includes a prismoidal glass 2, preferably transparent and of any suitable chromatice characteristic, green being efficient, the glass having a plane back surface on or adjacent to which is disposed a reflecting media. This media preferably consists of a mirror coat 3, Figure 6.

For the purpose of making the device useable either day of night there is combined with the night mirror 2 a day mirror of any desired type or form and here shown as a clear colorless glass 4 with a reflector back 5 placed against back 3 of the night mirror 2, Fig. 6.

The composite rear vision device is so mounted that it can be instantly rotated on its longitudinal axis to present either face rearward.

Various means may be devised and employed for associating the mirrors 2—4 as a unitary device. They may be cemented back to back, or pierced by through bolts in an obvious manner, unnecessary to be illustrated.

The mirror device is suspended on end pivots in a suitable bracket permitting the mirror unit to be reversed face for face.

Figures 1 to 6, inclusive, illustrate a form of mount including end plates 7 having binding flanges 7ª to crimp onto the complementary ends of the glass device which, in Figures 7 and 8, are shown as having marginal recesses 9. This form of binding means permits of grinding the faces of the glass from end to end.

A modification of the marginal binding means is shown in Figure 9, wherein the glasses have corner beads 10 to match respective flanges 7ª of the end plates 7.

In the above form of mount only portions of the ends of the ornate glass are concealed.

The mount plates 7 are supported on pivots 11 and are pivotally clamped between bracket arms 12—13 which are capable of being set so as to press firmly against the plates 7 and frictionally hold them at any desired angle, as convenient to the observer. If desired, friction washers 14 may be provided between the bracket arms and the mount plates 7.

To obtain the desired holding pressure of the arms 12—13 on the mirror device they are made relatively adjustable, and while this may be done by springing one toward the other, preferably one arm, as 12, is fixed on or is rigid with a hanger 15 shown as including a back leaf 16 to be bolted or suitably attached to a convenient support A.

The arm 13 is adjustably clamped in any desired manner to the bracket 15, as by a screw 17 passing through a slot 13ª in the arm 13 and engaging a pressure bar 18 which can be drawn hard down on the arm 13 after this has been shifted over to firmly grip the mirror device.

A means is shown whereby to draw the shiftable arm 13 to effective position, and in the present form consists of a screw 20 passing free in an arm lug 13ᵇ and threading in a fixed part 21 which may be an upturned end of the arm 12; this representing an economical construction.

If desired one pivot 11 may be extended and provided with a small knob 22 whereby to reverse the mirror device face for face.

In the form of hanger shown in Figure 10, the arms 12—13 are pivotally connected together by a pivot 24 so as to allow the arms to be closed onto the interposed mirror device by means of the contracting screw 20 connecting opposed parts of the arms. The arm assembly is adapted to be bodily angularly adjusted about a pivot 25 which connects the arm assembly to the hanger 15. By means of a suitable clamp instrumentality, as bolt or screw 26, the angularly arranged arms can be set tight at the desired position most convenient to the observer.

While the naked polished glass mirror device may be preferred for its inherent beauty, there is shown in Figures 12 and 13 a form in which the mirror set is bound in a narrow frame 28 with pivot bosses 29 for the friction washers 14.

By providing relatively adjustable clamp arms 12—13 to support the mirror unit there have been eliminated clamp nuts and threads therefor on the trunnions which, thus, may be on the arms (Fig. 4) or on the mounts (Fig. 2) or any combination thereof.

What is claimed is:

In a rear view mirror device, a stationary hanger, having a flange part, a spring bracket arm attached to said part and having a bowed gripping end, an opposite spring bracket arm bowed at its outer end and adjustably attached to said part, a mirror hung at its ends by said arms, and means connecting the arms to regulate their frictional grip on the mirror ends; the attachment for said arms comprising a pivot on said part for bodily swinging the arms as to the hanger, and means for setting the arms in angular adjustment.

BYRON D. BELL,
*Executor of Walter Joel Bell, Deceased.*